United States Patent [19]

Porter

[11] 4,342,582

[45] Aug. 3, 1982

[54] APPARATUS FOR FIBERIZATION OF MINERAL FIBER HAVING DIRECTIONAL SHROUD

[75] Inventor: William F. Porter, Lake Zurich, Ill.

[73] Assignee: United States Gypsum Company, Chicago, Ill.

[21] Appl. No.: 300,313

[22] Filed: Sep. 8, 1981

[51] Int. Cl.³ .............................................. C03B 37/05
[52] U.S. Cl. ............................................. 65/14; 425/8
[58] Field of Search .................... 65/6, 14; 264/8, 12; 425/8

[56] References Cited

U.S. PATENT DOCUMENTS

| 3,865,566 | 2/1975 | Kleist | 65/14 |
| 4,106,921 | 8/1978 | Porter | 65/14 |
| 4,246,017 | 1/1981 | Phillips | 65/8 |

*Primary Examiner*—Robert L. Lindsay, Jr.
*Attorney, Agent, or Firm*—Samuel Kurlandsky; Robert H. Robinson; Kenneth E. Roberts

[57] ABSTRACT

An apparatus for producing mineral fibers by low pressure air fiberization having a housing defining a substantially toroidal air chamber and having a substantially circular central opening, an annular slot provided around the central opening having an annular shroud affixed to the housing at the outer edge of the annular slot for confining and directing the primary jet leaving the annular slot and enabling it to be more efficiently utilized in fiberizing the mineral fibers. A cup-form spinner is mounted on a substantially horizontally oriented shaft arranged to be rotated. The spinner is mounted in front of the forward wall of the plenum and with the open end facing the forward wall. A duct is provided to direct molten slag into the spinning cup which ejects the molten slag into an air stream directed from the annular slot of the chamber and the shroud, thereby producing mineral fiber of excellent quality and in greater yield than results when the shroud is not utilized.

13 Claims, 7 Drawing Figures

APPARATUS FOR FIBERIZATION OF MINERAL FIBER HAVING DIRECTIONAL SHROUD

BACKGROUND OF THE INVENTION

1. Field of the Invention

The present invention relates to an apparatus for producing mineral fibers, and more particularly refers to such an apparatus in which compressed air is utilized to form the fibers instead of conventionally used steam.

2. Description of the Prior Art

It has been conventional in the prior art to produce glass and mineral wool fibers by conveying a stream of molten material such as glass or slag onto a rotating surface. The molten material is thereby centrifuged into the path of a high velocity stream formed of superheated steam, and the centrifuged material originally in the form of finely divided molten streams is blasted by the steam and formed into solidified material of fibrous form. Among the references which disclose this method are U.S. Pat. Nos. 2,869,175, 2,944,284, 3,013,299 and 3,022,538. However, the processes disclosed using steam have not been completely satisfactory, since, the relatively high velocity and impact force of steam causes an undesirable attenuation and severance or breakage of the mineral fibers, thereby reducing the efficiency of the apparatus and the quality of the finished product. Moreover, the use of steam requires rotor speeds of the centrifugal apparatus to be kept within critical limits in order to obtain filaments of a desired diameter. For example, where speed of the rotating disc is too high, the secondary attenuation produced thereby results in loose fibers which are too thin and frangible for normal use. Further, the fibers thus produced are of extremely short length and do not assume the structure of elongated threads or fibers. In order to overcome the deficiencies of steam operated fiberizing equipment, a method and apparatus are disclosed in U.S. Pat. No. 2,882,552 for using compressed air of low pressure to avoid the undesirable effects resulting from the use of high pressure steam. In the use of compressed air an advantage is realized in that no secondary attenuating defects are realized and the tendency to break or sever the filaments into short lengths are eliminated. However, the method and apparatus disclosed in that patent are not as efficient as desired and the quality of the mineral wool produced still leaves something to be desired with respect to the quality and the surface uniformity and smoothness of the finished fibers. Moreover, the apparatus disclosed in the patent is awkward to load and difficult to operate. The apparatus takes a lot of attention, is erratic, produces low yield and a high ratio of shot to fibers.

In U.S. Pat. No. 4,106,921, issued Aug. 15, 1978, of which applicant is one of the inventors, an apparatus for the low pressure air fiberization of mineral fiber is disclosed having an air plenum or housing with a central circular opening and defining a generally toroidal chamber. An annular slot is provided adjacent the circular opening for providing an air stream, and a duct is provided for transporting molten slag to the rotating cup. In an improved form a plurality of radial baffles are placed in the plenum around the central opening to provide uniform air flow to the annular slot. Additionally, as a further improvement, adjusting baffles are placed in the plenum to adjust the air flow for uniformity.

The present apparatus comprises an improvement over this apparatus resulting in raising the percentage of yield of fibers produced.

SUMMARY OF THE INVENTION

It is accordingly an object of the present invention to provide an apparatus for the fiberization of mineral fibers which is more efficient than that of existing methods and apparatus.

It is further an object of the invention to provide a method and apparatus for producing mineral fibers wherein the fibers are of more uniform and longer length and have better surface properties.

It is still further an object to provide a method and apparatus for the fiberization of mineral fibers which is relatively inexpensive and simple to fabricate, and which will operate over extended periods of time without the need for repair or rebuilding.

It is a primary object of the present invention to provide an apparatus for the fiberization of mineral fibers which enables mineral wool to be produced in higher product yields than that produced by similar equipment in the prior art.

Other objects and advantages of the invention will become apparent upon reference to the drawings and details of the description.

According to the invention, an apparatus for the fiberization of mineral fibers is provided having an air plenum or housing having a central circular opening and defining a generally toroidal chamber. An annular slot is provided adjacent the circular opening having a shroud or annular ring affixed to the front wall of the housing in registry with the outer edge of the annular slot. An air inlet is provided at a remote portion of the plenum. A rotating cup is provided at the annular slot and means is provided for transporting molten slag to the rotating cup. In an improved form a plurality of radial baffles are placed in the plenum around the central opening to provide uniform air flow to the annular slot. Additionally, as a further improvement, adjusting baffles are placed in the plenum to adjust the air flow for uniformity.

DESCRIPTION OF THE PREFERRED EMBODIMENTS

Figure 1:
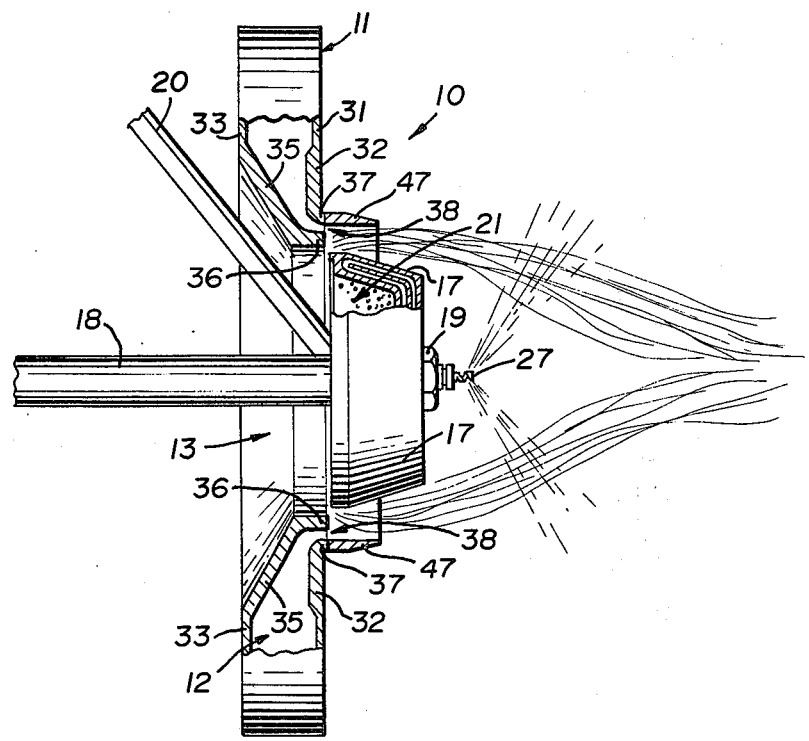
FIG. 1 is a side elevational view partly in cross-section of the apparatus of the invention.
Figure 2:
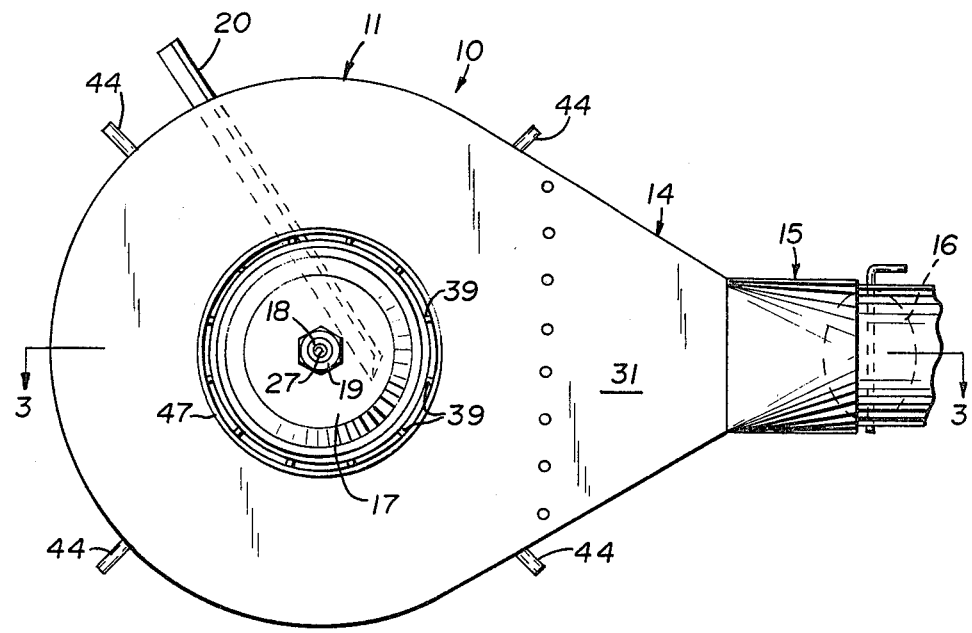
FIG. 2 is a front elevational view of the apparatus shown in FIG. 1.
Figure 3:
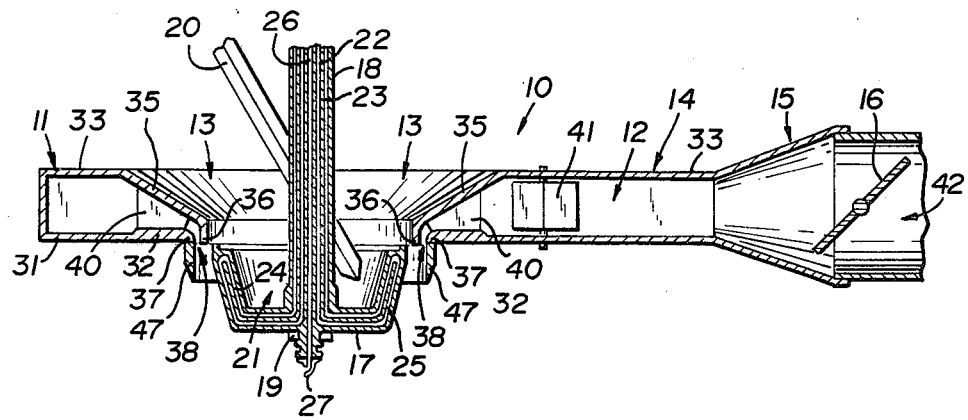
FIG. 3 is a cross-sectional view taken at the line 3—3 of FIG. 2, looking in the direction of the arrows.

Referring to FIGS. 1–3, the fiberization apparatus 10 is shown comprising an air plenum or housing 11 defining a substantially toroidal chamber 12 and having a circular central opening 13. The plenum 11 is provided with an elongated portion 14 terminating in an air inlet 15 having an adjustable damper 16 for controlling the rate of air flow.

A rotating cup 17 is mounted on a shaft 18 which is mounted for rotation and powered by a power source such as an electric motor. A nut 19 retains the cup 17 on the shaft 18. A trough 20 is provided for introducing molten slag into the cavity 21 of the cup 17. If desired the trough may be hollow and provided with water cooling.

As shown particularly in FIGS. 1 and 3, the shaft 18 is provided with water inlet and outlet tubes 22 and 23, which are in turn connected to water inlet and outlet tubes 24 and 25 provided in the cup 17. A central tube 26 is provided for conducting a material such as an adhesive or lubricant to be applied to the formed fibers and exits through a nozzle 27.

Figure 4:
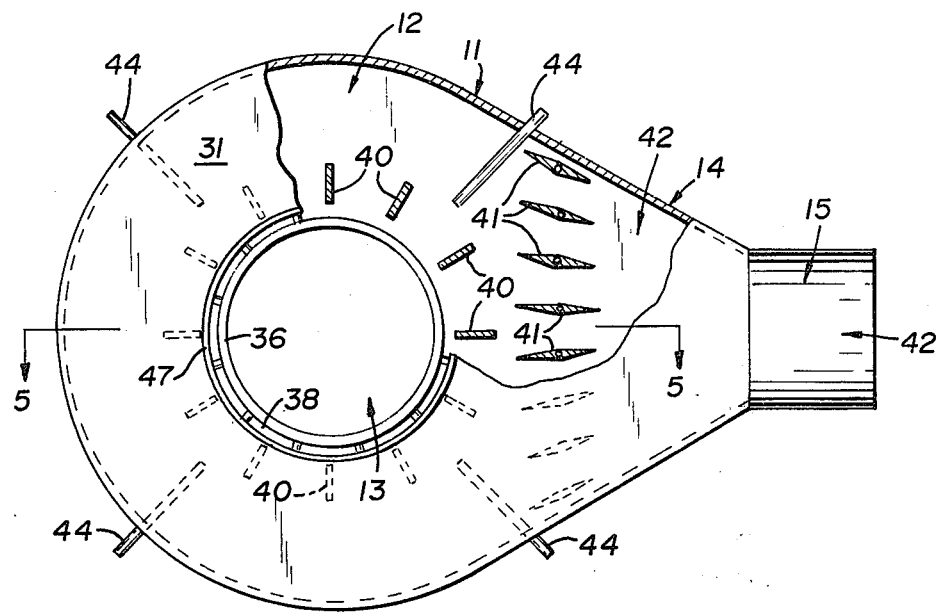
FIG. 4 is a front elevational view, partly broken away, of the air plenum of the invention.
Figure 5:
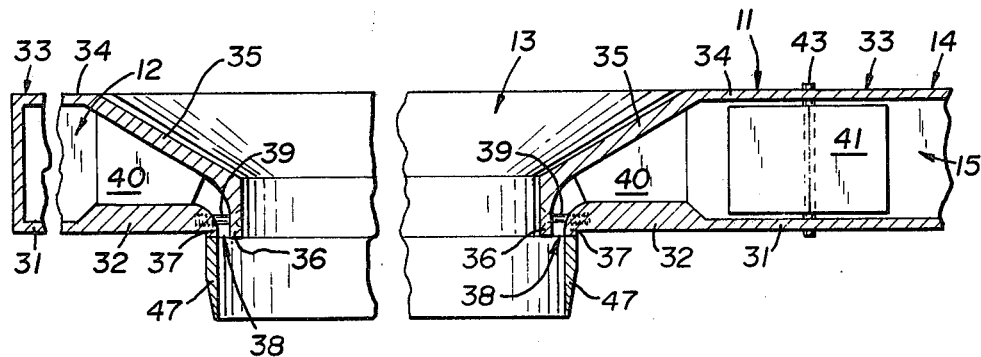
FIG. 5 is a cross-sectional view taken at the line 5—5 of FIG. 4, looking in the direction of the arrows.

Referring to FIGS. 4 and 5, the air housing or plenum 11 of the invention is shown in detail and comprises an annular front wall 31 having an inner enlarged portion 32 which may comprise an annular plate welded to the front wall 31. The plenum 11 further comprises a rear wall 33 comprising an annular plate welded to the front wall 31. The plenum 11 further comprises a rear wall 33 comprising an annular rear wall member 34 and a conical wall member 35 affixed to the rear wall member 34 and terminating in a lip portion 36. The enlarged portion 32 of the front wall 33 is also provided with a lip member 37 which cooperates with the lip member 36 of the rear wwall to define an annular slot 38 adapted to discharge compressed air from the plenum chamber. Staybolts 39 maintain the lips 36 and 37 in spaced-apart position. A spacing of up to 1 inch may be used, although excellent results are obtained with spacing of ¼ inch.

In order to provide uniform air flow from all portions of the annular slot 38, fixed radial vanes 40 are mounted within the torodial chamber 12 by any suitable means such as welding. Additionally, adjustable vanes 41 are provided in the extended air inlet portion 14 of the plenum 11 for further insuring uniform distribution of air. The vanes 41 are mounted on a vertical shaft 43 which may be rotated by any suitable means such as a wrench or handle. Pressure sensing probes 44 are mounted at several positions within the plenum chamber to monitor the air pressure at various points to facilitate adjustment of the adjustable vanes 41. The probes are hollow tubes sealed at the distal end and provided with holes along the side.

Referring to FIGS. 1, 3, and 5, the primary feature of the present invention is shown which comprises a shroud or annular cylindrical structure 47 which is affixed to the enlarged portion 32 of the annular wall 31 by means such as spot welding at intervals around the structure. The shroud is so designed that its inner cylindrical surface is substantially perpendicular to the front wall and is in register with the edge of the enlarged portion 32 of the front wall forming the outer surface of the annular slot 38. The shroud 47 is mounted axially and extends forwardly with respect to the apparatus.

Figure 6:
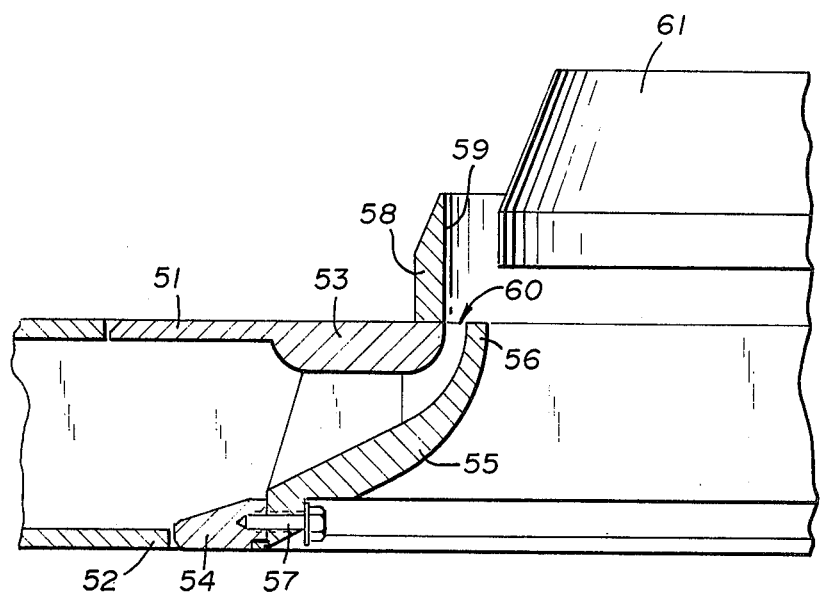
FIG. 6 is an enlarged fragmentary view, partly in cross-section, showing one form of shroud.

Referring to FIG. 6, a somewhat modified form of the fiberization apparatus is shown comprising a front wall 51 and rear wall 52. The front wall 51 has a front wall enlargement 53 and the rear wall 52 has a rear wall enlargement 54. A conical wall member 55 having a curved edge 56 is affixed to the enlarged portion of the rear wall 54 by means of a screw 57. A trapezoidally shaped shroud or annular member 58 is affixed to the front wall enlargement 53 by means such as spot welding at spaced intervals. The shroud 58 shown is in the form of a trapezoid and has its inner cylindrical surface 59 substantially perpendicular to the outer surface of the front wall enlargement 53, and is in registry with the edge of the front wall enlargement 53. The edge of the front wall enlargement 53 and the curved edge 56 of the frustoconical member 55 cooperate to define an annular air slot 60. A portion of a rotor 61 is shown mounted inside of the shroud 58.

Figure 7:
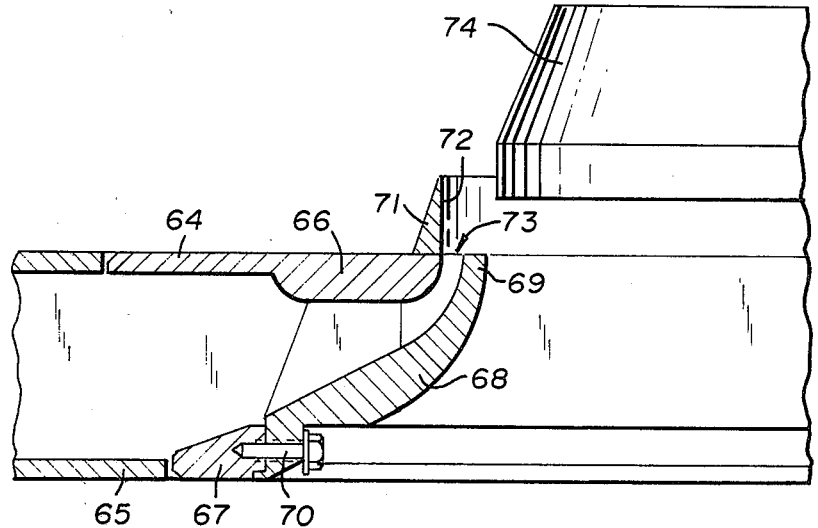
FIG. 7 is an enlarged fragmentary view, partly in cross-section, showing a modified form of shroud.

Referring to FIG. 7, a somewhat modified embodiment of the invention is shown comprising a front wall 64, a rear wall 65, a front wall enlargement 66, and a rear wall enlargement 67. An annular conical wall member 68 is shown having a curved or involuted edge 69, the frustoconical member 68 being affixed to the rear wall enlargement 67 by means of a screw 70. A shroud 71 having an inner cylindrical surface 72 substantially perpendicular to the outer surface of the front wall enlargement 66 and in registry with the edge of the front wall enlargement is affixed to the outer surface thereof by such means as spot welding at intervals. The edge of the front wall enlargement 66 and the involuted edge 69 of the frustoconical member cooperate to define an annular air slot 73. A rotor or spinning cup 74 is shown mounted within the shroud.

In operation, the shaft 18 is rotated, causing the cup 17 to rotate. Water is forced into the ducts of the shaft and around the ducts of the cup 17 and then discharged through the shaft 18 again to keep the cup 17 cool. Additionally, a treating material such as an adhesive is forced through the duct 26 of shaft 18 and through the nozzle 27, causing the material to be sprayed over the formed mineral fibers. Molten slag is introduced into the groove of the feeding trough 20, and is discharged into the chamber of the cup 17. The centrifugal force developed by the cup 17 causes the molten slag to be ejected in small streams radially outwardly. Air pressure is applied to the compressed air inlet 15, causing air from within the plenum to be forced out of the annular slot 38. The expelled air catches the small streams of molten slag and transforms them into mineral fibers of excellent diameter and length and having smooth surface properties and great strength. Additionally, the adhesive expelled from the nozzle 27 becomes coated on the surface of the fibers.

In the past, and as described in U.S. Pat. No. 4,106,921 the structure utilized an abruptly edged annular slot located in the air ring, surrounding the periphery of the wheel, to discharge the attenuation air blast into the fiber formation zone and to complete the attenuation of the molten material into fiber. It was found that this primary air blast induced secondary air from both boundries of the jet to expand radially beyond the annular slot, increasing its total volume and radial dimension in the area of the rotor and thus reducing the velocity of the air stream. The net affect of this phenomenon was that the primary jet velocity dissipated rapidly and only the induced air at the inner boundries benefited the fiber forming process. With the presence of the shroud or ring of the present invention, the primary jet is confined, isolated and restricted from inducing air and expending its velocity outside the fiber attenuation zone.

Plant scale tests have indicated that the product yield attained by the use of the shroud of the present invention has been increased from 71.18% to 78.09%. In addition to the increased product yield, a higher ratio of fiber yield to shot content has been obtained solely through the addition of the shroud to the existing equipment.

In carrying out the process utilizing the present invention, air pressure of 3-3 psig (pounds per square inch gauge) should be used. A preferred range is from 6-7 psig. The air volume rate should be from about 2000–10000 cubic feet per minute with a preferred air volume rate of about 80000 cubic feet per minute. The use of a large mass of air at large volume and low pressure to transform the molten mineral slag into fiber, as opposed to larger air pressure at low volume, results in the production of fibers of excellent length and having very smooth surface characteristics. Additionally, increased production rate and large savings are achieved. A further advantage is that operating cost savings for each apparatus range from $8.00 per hour to $20.00 per hour (depending on fuel and power costs). The fibers produced with air blowing are finer, smoother and stronger than those produced with steam. Mineral fiber batts produced with the present invention are more resilient and exhibit better handling characteristics than steam blown batts. The fibers produced by the present invention, when viewed with a scanning electron microscope, appear smooth and provide improved resilience and handleability. Moreover, by the use of the present shroud or annular ring for controlling the air jet, a greater yield of better material is obtained. For best results rotating cup speeds in the range of from about 2000 rpm to about 3000 rpm should be utilized.

It is to be understood that the invention is not to be limited to the exact details of operation or materials shown or described, as obvious modifications and equivalents will be apparent to one skilled in the art.

Invention is claimed as follows:

1. In an apparatus for producing mineral fibers by forming molten slag and transforming the slag into fibers, the improvement comprising in combination:
   (a) An air plenum defining a substantially toroidal air chamber and having a circular central opening, wherein said plenum is formed of a front wall, a rear wall, and a peripheral wall connecting said front wall and rear wall in spaced-part relationship, a substantially conical wall having its outer edge connected to said rear wall and surrounding said central opening and converging towards said forward wall and defining a funnel for directing air toward said central opening, the radial dimension of said air chamber being greater than the axial dimension thereof, the lip of said front wall and the lip of said converging conical wall cooperating to define an annular slot for discharging air from said torodial chamber through said slot in an axial direction with respect to said torodial chamber, and a compressed air inlet provided in said plenum,
   (b) An annular shroud in the form of a collar affixed at one edge to the lip of said front wall, said shroud having an inner cylindrical surface substantially perpendicular to the outer surface of said front wall and in registry with the edge of the lip of said front wall at the outer periphery of said annular slot, said shroud serving to guide and restrain radially air stream emerging from said annular slot and preventing it from expanding radially,
   (c) a cup mounted on a shaft adapted for rotation, the lip of said cup being positioned at said annular slot, and
   (d) means for introducing molten slag into the interior of said cup when said cup rotates, the arrangement being such that centrifugal force produced by rotation of said cup expels streams of molten slag into the air stream being discharged from said annular slot, and the air stream which is contained radially by said shroud transforms said slag streams into mineral fibers with improved yield.

2. An apparatus according to claim 1, wherein said shroud has a substantially rectangular cross-section.

3. An apparatus according to claim 1, wherein said shroud has a triangular cross-section.

4. An apparatus according to claim 1, wherein said shroud has a trapezoidal cross-section.

5. An apparatus according to claim 1, wherein a portion of said plenum is elongated at said air inlet.

6. An apparatus according to claim 1, wherein a valve is provided in said plenum at said air inlet to control incoming air.

7. An apparatus according to claim 1, wherein fixed radial vanes are provided in said plenum surrounding said slot for controlling uniformity of air flow from said annular slot.

8. An apparatus according to claim 5, wherein adjustable vanes are provided in the elongated portion of said plenum for equalizing air flow.

9. An apparatus according to claim 1, wherein said annular slot is defined by spaced-apart lips directed forwardly, and the lip of said cup is directed rearwardly and oppositely to the lips of said plenum.

10. An apparatus according to claim 6, wherein the lips defining said annular slot are spaced at least about ¼ inch apart.

11. An apparatus according to claim 1, wherein water ducts are provided in both said shaft and said cup for providing cooling thereof.

12. An apparatus according to claim 1, wherein a duct is provided in said shaft and a nozzle is provided at the end of said duct for spraying treating materials on said mineral fibers.

13. An apparatus according to claim 1, wherein said front wall and said rear wall each have an annular lip surrounding said central opening directed forwardly, said lips being spaced-apart and cooperating to define said annular opening in the form of an annular slot.

* * * * *